Aug. 6, 1963  J. A. SCHNEIDER ETAL  3,100,117
FLOATING ARBOR
Filed Nov. 30, 1960  2 Sheets-Sheet 1
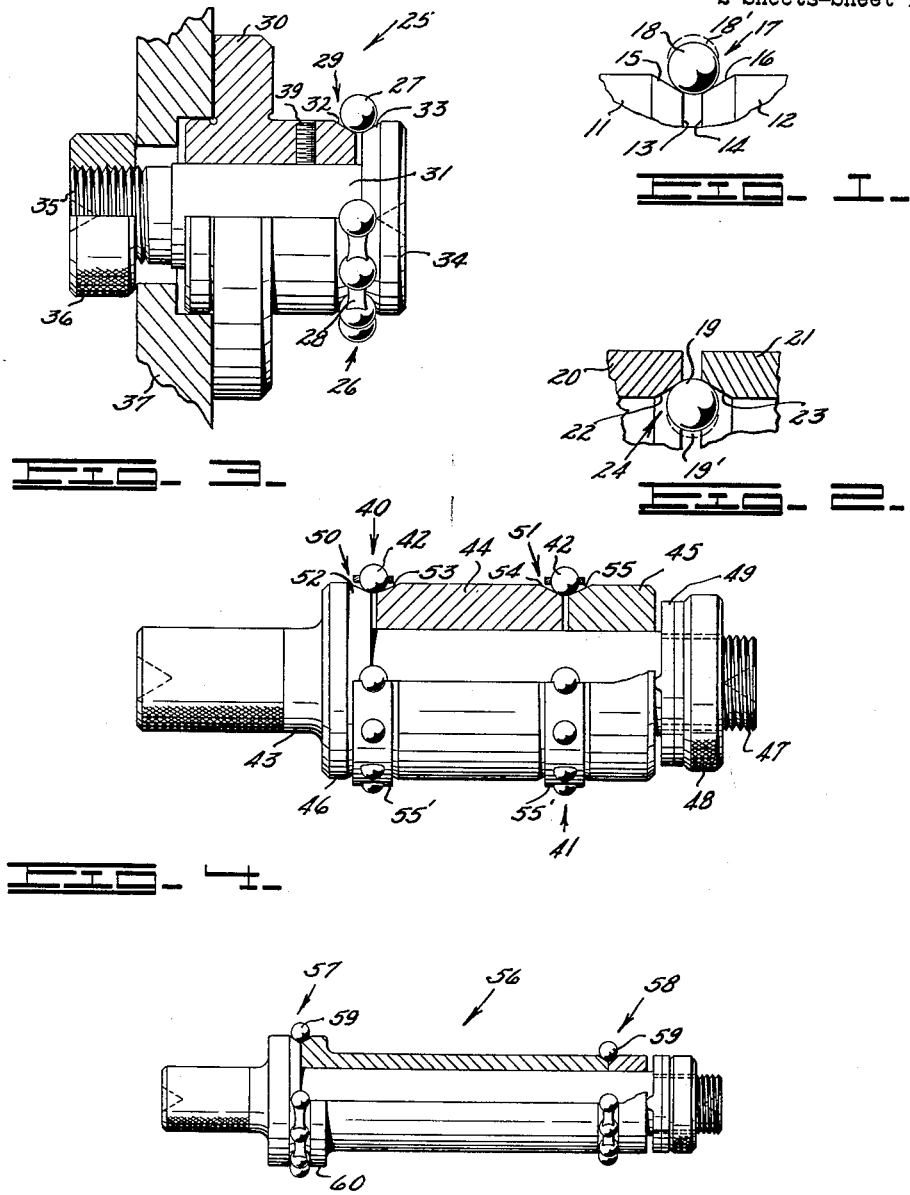
INVENTORS
JOHN A. SCHNEIDER
THEODORE PASCH
BY
Miller Morris & Pappas
ATTORNEYS Aug. 6, 1963   J. A. SCHNEIDER ETAL   3,100,117
FLOATING ARBOR
Filed Nov. 30, 1960   2 Sheets-Sheet 2
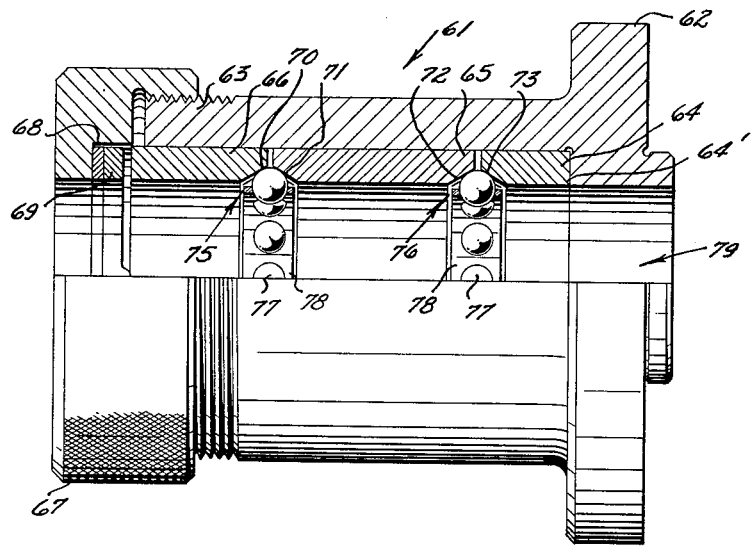
FIG. 6.
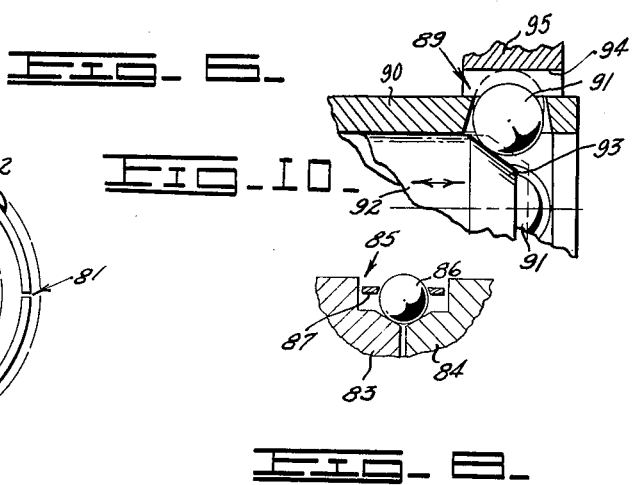
FIG. 10.
FIG. 8.
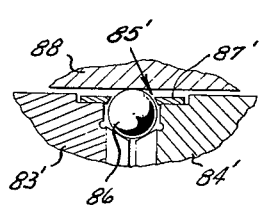
FIG. 7.
FIG. 9.
INVENTORS
JOHN A. SCHNEIDER
THEODORE PASCH
BY
Miller, Morriss, & Pappas
ATTORNEYS United States Patent Office 3,100,117
Patented Aug. 6, 1963

3,100,117
FLOATING ARBOR
John A. Schneider, Lansing, and Theodore Pasch, North Muskegon, Mich., assignors to A. D. Schneider and Company, Lansing, Mich., a partnership
Filed Nov. 30, 1960, Ser. No. 72,643
6 Claims. (Cl. 279—66)

The present invention relates to an arbor and more particularly to a high precision arbor wherein high accuracy is obtained by use of high accuracy low cost components. Still more particularly the present invention relates to an arbor structure for internal or external engagement with work pieces wherein a plurality of balls are radially urged into surface engagement with the work piece without distorting strain in the expanding members.

Expanding arbors of wide variety and complicity are well known for both holding and rotation. However as applied, for example, to concentricity checking, fixtures employing conventional arbors are either inaccurate, have poor range of adjustment, or are excessively expensive.

Hence it is the purpose of the present invention to provide an arbor construction wherein the superior accuracy and low price of balls as the adjustment medium results in high accuracy, low cost, and extended range of adjustability. Such arbors, in accord with the present invention are utilizable in external or internal gripping fixtures and accommodate simple or compound overhang in combination with a wide variety of shapes with no part distortion and in avoidance of wear by reason of linear movement. The devices in accord with the present invention also establish centers on the parts served independently of the line centers which may or may not be provided in the fixture. Thus fixtures utilizing the present invention may be applied to polygonal or even ovoid internal or external situations. The repetitive accuracy of the structures is maintained through long life by reason of the antifriction construction. As will be appreciated their applicability in holding and checking fixture design is relatively unlimited.

In the simplest form, the present invention involves the use of a tubular ball retaining structure and a taper face movable into and out of contact with high precision balls so that the balls are radially moved inwardly and outwardly. Thus the amount of radial extension of the balls is a function of the amount of taper and the size of ball. The accuracy of the fixture so employed is flee of slop and reflects the low cost accuracy of the hardened balls on the axially movable taper race. The ball ring thus establishes a center against which chucking, checking, holding, and concentricity can be accurately determined. Preferably, the present invention involves a pair of taper faced rings relatively movable along a true axis toward and away from each other and with a row of balls occupying the groove formed by the rings. As the rings are brought into closer relative relation the balls are caused to shift position radially. This movement causes the balls to engage a work piece. The precision of the balls is put to work in gripping engagement in either an outward or inward radial movement and the superior accuracy and cheapness of the balls greatly reduces the cost of such structures. The generally described construction is applicable to plural concentric faces and is variable in range by replacement of ball sizes. The anti-friction characteristic of the balls reduces wear to both stock and arbor.

In the drawings:

FIGURE 1 is a partial detail elevation showing a pair of opposed taper faces defining a groove in which a ball is positioned. As the taper faces are urged together the ball moves outwardly in the plane of the groove.

FIGURE 2 is a partial detail elevation showing a pair of opposed taper faces defining a groove and acting upon a ball as the faces are urged together causing the ball to move in the plane of the groove.

FIGURE 3 is a partially sectioned side elevation view of a simple arbor utilizing the construction as detailed in FIGURE 1.

FIGURE 4 is a partial section elevation view of a multiple row ball construction for gripping internal cylindrical surfaces of a work piece to be gripped and checked.

FIGURE 5 is a partial section elevation view of a structure as shown in FIGURE 4 but arranged to simultaneously engage plural diameters as in tapers or stepped construction of bores in workpieces.

FIGURE 6 shows an arbor in accord with the present invention in a partially sectioned elevation view with plural rows of balls for engagement with external diameters of stock and following the form of movement as shown in FIGURE 2.

FIGURE 7 is a plan view of a ball row indicating a split ring ball retainer structure.

FIGURE 8 is a partial detail in elevation of a pair of taper faced rings forming a ring groove and illustrates the ball retainer function.

FIGURE 9 is a detail in elevation showing a modified ball retainer seat in the rings and showing the ball extended into engagement with a workpiece.

FIGURE 10 is a detail section in elevation showing a single taper form of the present invention.

*Specific Description*

Referring to FIGURE 1 a pair of relatively movable pieces 11 and 12, movable toward and away from engagement with each other are shown. If each of the engageable faces 13 and 14 respectively are provided with opposed chamfer-like tapers 15 and 16, respectively, they form a ball supporting groove 17. If a ball 18 is placed in the groove 17 the ball 18 will be moved outwardly as to position 18' as the movable pieces 11 and 12 are urged toward each other and as the pieces 11 and 12 are separated the ball 18 will retreat to its shouldering seat against the tapers 15 and 16 as shown in solid line. Thus if a work piece (not shown) was positioned in the pathway of the ball 18 and the pieces 11 and 12 were drawn toward each other the ball 18 would make contact with the surface of the workpiece if within the range of ball travel. As will be seen this is very useful when the balls are arranged in an annular groove. As will be appreciated the extent of travel will be a function of the angle of the taper faces 15 and 16. The FIGURE 1 structure will be appreciated as a simplification of the device in FIGURE 3.

In FIGURE 2, the ball 19 is arranged for downward (or inward) movement in accord with the relationship of pieces 20 and 21 toward and away from contact with each other. As in FIGURE 1, this is true since the chamfer-like taper faces 22 and 23 urge the ball 19 downward or inward as at position 19' as the faces 22 and 23 close upon each other and constrict the groove 24. Thus the relationship of elements in FIGURE 2 is a simplification of the structure in FIGURE 6 as applied to a ring of balls.

FIGURE 3, places the ball operation shown in FIGURE 1 to work. A checking arbor 25 is shown with a single row 26 of balls 27. Ball retainers 28 are shown somewhat schematically as separating the balls 27 and preventing drop-out from the annular V-groove 29 resulting from the relationship of hub piece 30 coaxially journalled on the axle piece 31. Each of the relatively movable pieces 30 and 31 are provided with annular opposed chamfer-like taper faces 32 and 33 respectively. The taper face 33 is provided on the head 34 of the axle piece 31. The axle piece 31 passes axially through the hub piece 30 and is provided on its opposite end with a threaded stub portion 35. A nut 36 is positioned over the threaded portion 35 and when the nut 36 is tightened as against the mounting plate 37 this draws the axle piece 31 into closer relationship to the hub piece 30 thereby radially extending the balls 27 as the annular taper faces 32 and 33 close toward each other. When the fixture 25 is used for checking, the balls 27 are radially extended to engage an internal diameter, for example, of a master part. Then the set screw 39 radially through the hub 30 is set against the axle piece 31 fixing the adjustment of the position of the balls 27. As will be appreciated such a set-up is repetitiously useful for checking concentricity of a bore in a workpiece, or checking bore dimensions. In concentricity checks the part is easily spun on the fixture and run-out is easily observed.

In the device of FIGURE 4 another form of arbor fixture is shown wherein plural rows 40 and 41 of balls 42 are made use of. As in the structure of FIGURE 3 an axle piece 43 is provided coaxially through the sleeve pieces 44 and 45, the latter sleeve piece functioning substantially as the hub 30. The axle piece 43 is provided with a flange head 45 at one end and a threaded stub extension 47 at the other end thereof. A nut 48 is provided threadable over the stub 47 and bears adjustably against the sleeve piece 45. This is accomplished directly or through the thrust discs 49 as shown. Annular grooves 50 and 51 are provided as between the head 46 and sleeve 44 and between the sleeve 44 and sleeve 45 by reason of the chamfer-like taper faces 52, 53, 54, and 55. The balls 42 ride in these grooves 50 and 51 and as the nut 48 is tightened the faces 52, 53, 54 and 55 are urged toward each other and the balls 42 are radially expanded into engagement with working faces (not shown) on selected work pieces. As will be appreciated the balls 42 seek wall contact and by reason of the size of balls 42 and size of opening will stop at snug engagement. Retainers 55' are provided to prevent ball loss and to provide adequate ball separation.

In FIGURE 5 a taper or step accommodating fixture 56 is shown wherein a plurality of rows 57 and 58 of balls 59 are provided as in the structure of FIGURE 4, but one row 57 is provided on a portion 60 of the structure of increased diameter. In other regards the structure is substantially as in FIGURE 4. FIGURES 3, 4, and 5 are all directed to arbors for gripping an internal opening in a workpiece.

In FIGURE 6 a modified arbor element is shown for gripping a work piece over a shank and for chucking to an outside diameter and the like. The fixture 61 comprises an outer tubular housing 62 threaded on the end 63. Inside the housing 62 are a plurality of sleeves 64, 65, and 66. The sleeves 64, 65, and 66 are coaxial in journal relationship with the opening through the tubular housing 62. Over the threaded portion 63 of the housing 62 is a nut element 67 provided with a relief opening 68 and thrust pads 69. The pads 69 bear upon the sleeves 64, 65, and 66 so that as the nut 67 is turned the sleeves are urged into or out of engagement with each other. On the internal side of each of the sleeves, 64, 65, and 66 and where they tend to meet, chamfer-like taper faces 70, 71, 72, and 73 are provided thereby presenting a pair of annular internal grooves 75 and 76. A plurality of balls 77 are distributed in each groove 75 and 76 and a retainer ring 78 is provided about the balls 77 to maintain separation and avoid ball fall-out. As the nut 67 is tightened this urges the sleeve elements 64, 65, and 66 into closer relationship with each other and the balls 77 are thereby shoved radially into the opening 79 and are thereby adjusted into contact with a working face, for example, that would be inserted in the opening 79. This provides an arbor gripping and checking arrangement. As will be appreciated sizing of one set of balls 77 may be different than the size of another row thereby providing a double external fixture for checking, for example, a shaft provided with an annular boss. As in the structure of FIGURE 5 this also can be accomplished by providing an internal annular chamfer-like taper shoulder on a pair of adjacent sleeves, and diminishing the diametral relationship of one of the rows of balls 77. It will also be appreciated that the case structure may be modified in some instances to function as at least one of the sleeves, for example, sleeve 64. In this form the shoulder 64' would be prepared with an internal chamfer-like taper annulus, so as to form a ball controlling V-groove. Since it is preferred to harden the taper faces the arrangement as illustrated is preferred. The function of the structure of FIGURE 6 is best understood by reference to FIGURE 2. As will be understood in specific situations the sleeve members may be keyed to the shaft element or case so as to permit rotation only on the ball members while allowing lateral movement as between sleeves and shaft.

The matter of ball retention requires considerable attention and, of course, a wide variety of commercial ball retainers are adequate. In FIGURE 7 a split ring retainer 80 is shown broken at 81 and provided with ball separator openings slightly undersized from ball diameter so as to allow radial and peripheral movement of the balls 82 in the plane of the ball grooves as described as described and illustrated in avoidance of fall-out. This is best illustrated in the detail section of FIGURES 8 and 9 where the sleeve members 83, and 84 and 83' and 84' are provided with a retainer recess 85 in FIGURE 8 and recess 85' in FIGURE 9 of variant depth. In both FIGURES 8 and 9 the balls 86 are separated from each other by retainers 87 and 87'. In FIGURE 9 a fragment of the face of a workpiece 88 is shown engaged with one of the balls 86. As will be appreciated the spacing of the balls may be fixed by the retainer as for use in splines, gears, or the like.

In FIGURE 10 the single taper form of the invention is shown by way of a detail section through a ball pocket 89 provided in a tubular case 90. As will be appreciated the pockets 89 are provided radially through the case 90. The case 90 thus serves as a retainer and separator for the balls 91. A shaft piece 92 or core piece is in journalled relationship to the case 90 and is axially movable in respect thereto. The ball engaging face 93 is tapered in annular chamfer form and is movable into and out of engagement with the balls 91. As axial movement of the shaft 92 is accomplished the hardened taper face 93 causes radial movement in the balls 91 until they engage a surface 94 of a work piece 95. As will be appreciated this form of the invention may be reversed for internal rather than external ball movement. Plural ball ring arrangements are best accomplished by separate sleeve members but in single ring structures the FIGURE 10 arrangement has proven very satisfactory.

High accuracy balls are readily available commercially in hardened form. The taper faces on the sleeve-rings are easily ground to high accuracy and hardened. As is appreciated the balance of the structure is easily and cheaply fabricated, the draw element and the sleeve-ring elements being a self journalling concentric relationship on a common axis. A variety of ball retainers are available including resilient and flexible retainers of Teflon, polyethylene and neoprene or the like as well as more conventional steel stamped ball retainers in full circle or split form.

While not illustrated, the range of usefulness of the present invention is greatly extended by utilizing a resilient coaxial force as between the sleeve and shaft members thereby placing an adjustable resilient bias on the balls in their radially extended positions.

In usage the devices herein described have introduced high accuracy checking at reasonable fixture cost and have minimized error by the simple utility of a ball as the basis for accuracy control. The taper faces are also ground to reflect a general desired accuracy. The balls also provide excellent anti-friction characteristics where the part being checked requires rotation and on routine usage as a dimensional check element the devices have been found to have excellent repetitive accuracy, and excellent wear resistance both as to the fixture and parts used with the fixture. As shown in FIGURE 3, the structure readily adapts itself to a variety of fixed mounting arrangements as desired in given usages. By appropriate spacing of the balls polygonal openings or shafts may be gripped and a center accurately located. As will also be appreciated the devices of the present invention establish a center generated by the ball ring without resort to reliance upon alignment as between live or dead centers.

Having thus described our invention a wide variety of modifications and improvements will occur to those skilled in the art. Such modifications and improvements are intended to be expressed herein and are intended to be included within the scope of the present invention limited only by the scope of the hereinafter appended claims.

We claim:

1. An arbor device comprising: a first member; a second member axially moveable in respect to said first member, said first and second members defining therebetween an annular groove and said annular groove having a common axis with said first and second members; a plurality of spaced apart freely rotatable balls retained in said groove and radially moveable in accord with the selective opening and closing of said groove; and means for selectively urging said first and second members toward and away from each other.

2. An arbor comprising at least one pair of adjacent coaxial ring pieces; an annular tapered face on each said piece in facing relationship to the adjacent said piece, said tapered faces together defining an annular groove about and between said pieces; a plurality of freely rotatable balls retained in spaced relationship in said groove; and means for drawing said ring pieces into adjusted closing contact each with the other, thereby urging said balls outwardly of said groove and radially of said ring pieces.

3. An arbor holding fixture comprising: a plurality of coaxially aligned adjacent sleeve like ring members, each of said ring members having annular adjacent chamfer-like taper edges and each pair of said ring members thereby defining annular grooves; a plurality of freely rotatable balls distributed and retained in said grooves; and means urging said ring members axially toward and away from each other thereby opening and closing said grooves.

4. An arbor structure comprising: a plurality of coaxially aligned sleeves each having an annular chamfered edge, said adjacent chamfered edges defining an annular groove between adjacent pairs of said sleeves; balls annularly retained in each of said grooves; a draw member in journalled relation to said sleeves and extending and in axial thrust engagement with one of said sleeves on the axis of said sleeves; and draw means secured to said draw member and movable axially therealong bearing against said sleeves thereby urging said sleeves into closer adjacent relationship and causing consequent movement of said balls.

5. An arbor structure comprising: a base draw element, said element having a flanged head at one end and a threaded portion at the other end; a plurality of sleeve rings in axial journalled relationship to said draw element and one of said draw elements in thrust engagement with said flange of said draw element; annular chamfer-like faces provided on said sleeve rings which define annular V-grooves between adjacent sleeve rings; an annulus of balls in said V-grooves; a retainer spacing and securing said balls against chance dislodgement; and a nut over said threaded end of said draw element which when tightened axially moves said sleeve-rings into closing relationship each with the next adjacent sleeve ring, thereby causing displacement radial to the common axis of said sleeves and draw element.

6. In a dynamic arbor structure for determining a common true axis on a work piece the combination comprising: a first cylindrical element; a second coaxially positioned cylindrical element, said cylindrical elements axially moveable toward and away each from the other; annular chamfer faces in each of said cylindrical elements together defining an annular V-groove between said cylindrical elements at their contact; a bias applied to one of said cylindrical elements urging contact therebetween; a plurality of freely rotatable balls in said annular groove defined by said chamfer faces, and a ball retainer structure maintaining non-rigid spacing as between said balls.

References Cited in the file of this patent

UNITED STATES PATENTS

| 2,365,980 | Thomas | Dec. 26, 1944 |
| 2,775,137 | Chung | Dec. 25, 1956 |
| 2,807,473 | Kiehne | Sept. 24, 1957 |

FOREIGN PATENTS

| 56,076 | France | June 4, 1952 |